United States Patent [19]

Taylor

[11] Patent Number: 4,856,281

[45] Date of Patent: Aug. 15, 1989

[54] SOLAR POWER PLANT AND STILL

[76] Inventor: William P. Taylor, 22291 Caminito Tiburon, Laguna Hills, Calif. 92653

[21] Appl. No.: 291,139

[22] Filed: Dec. 28, 1988

[51] Int. Cl.[4] ............................................... F03G 7/02
[52] U.S. Cl. .................................. 60/641.9; 60/641.11; 126/415
[58] Field of Search ............... 60/641.8, 641.9, 641.11, 60/641.12; 126/415, 416

[56] References Cited

U.S. PATENT DOCUMENTS 4,033,126  7/1977  Newland ..................... 60/641.12 X
4,408,459 10/1983  Yogev ............................. 60/641.8

Primary Examiner—Allen M. Ostrager
Attorney, Agent, or Firm—Thomas J. Plante

[57] ABSTRACT

A solar power plant and still is disclosed in which a heat source for a Rankine Cycle engine is provided by a shallow pond which is covered by a sheet of suitable material, i.e., plastic; and which has a layer of air between the pond and the cover, flowing in accordance with a flue-induced motion, and moving water vapor from the pond through the flue. Because both the ambient air and the water supply enter at the periphery of the pond, at a location remote from the flue, their temperature gradients both rise from the pond periphery toward the flue.

6 Claims, 3 Drawing Sheets

SOLAR POWER PLANT AND STILL

BACKGROUND OF THE INVENTION

The present invention relates to the type of solar power plant in which solar energy vaporizes water to provide usable heat energy and also produces distilled water when the vapor is subsequently condensed. A primary concern is the maximum extraction of energy, using a relatively simple and inexpensive system.

The use of solar energy to vaporize salt water has been suggested as a desalinization method. This possibility is suggested in these U.S. Pat. Nos. 2,636,129 Agnew, 3,338,797 Hermansen et al, and 4,244,189 Bliamptis.

The need to which the present invention is primarily addressed is the use of such a system to provide maximum power extraction at minimum cost.

SUMMARY OF THE INVENTION

The present invention combines a solar energy produced heat source with a heat sink, in order to drive a Rankine cycle engine. And it utilizes water ponds at different elevations to provide the heat source and heat sink.

The water pond which provides the heat source is preferably a shallow pond which is covered by a sheet of suitable material, i.e., plastic; and which has a layer of air between the pond and the cover, flowing in accordance with a flue-induced motion, and moving water vapor from the pond through the flue. Because both the ambient air and the water supply enter at the periphery of the pond, at a location remote from the flue, their temperature gradients both rise from the pond periphery toward the flue.

DETAILED DESCRIPTION OF THE PREFERRED EMBODIMENT

Figure 1:
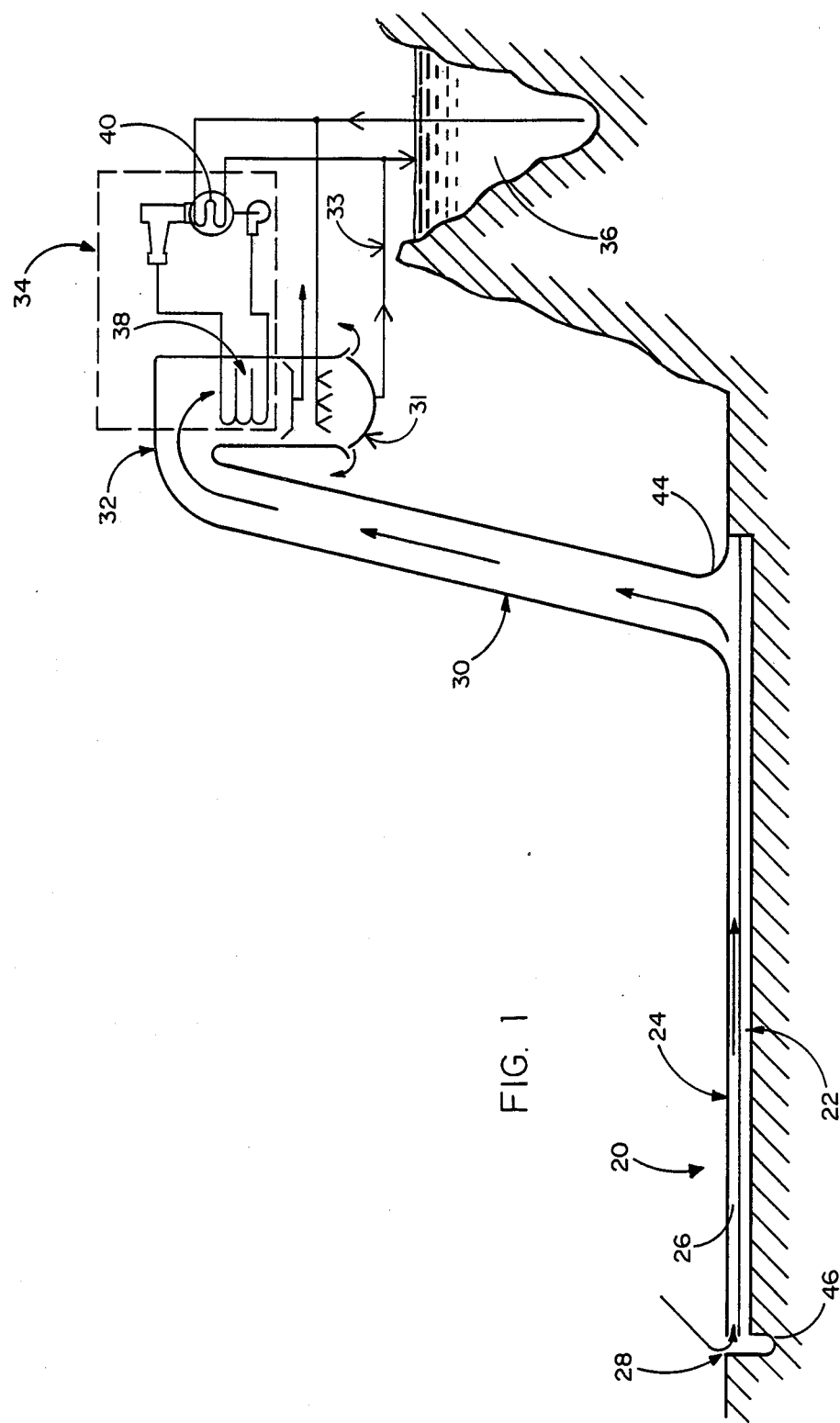
FIG. 1 shows schematically the entire solar power/solar still system.

As seen in FIG. 1, a solar energy collector 20 comprises a shallow water pond 22, a cover 24 above the pond, and an air space 26 between the pond and the cover.

Solar energy reaches the pond 22 through the cover 24, heating and humidifying ambient air induced to enter along a continuous peripheral air inlet. The solar energy heats and humidifies the entering air. The heated and humidified air, which is much less dense that the ambient air, rises in a chimney, or flue, 30 to a higher elevation, as indicated by the arrows.

At the higher elevation a heat exchanger 32 is provided, in which most of the water vapor is condensed; and the energy produced by the condensation, which equals the energy of evaporation, is used to drive a Rankine cycle engine, shown schematically in the dashed-line-enclosed area 34. Condensation of the water vapor occurs in a vessel 31, from the bottom of which warm water may be drained through line 33. This water is hot enough to be useful for domestic hot water supply and/or space heating, if desired.

A heat sink for the engine may be provided by a reservoir 36. Cold water pumped from the bottom of the reservoir may be used to enhance the temperature differential between high temperature heat transfer coils 38 at the heat exchanger 32 and low temperature heat transfer coils 40 at the other end of the Rankine cycle.

Figure 2:
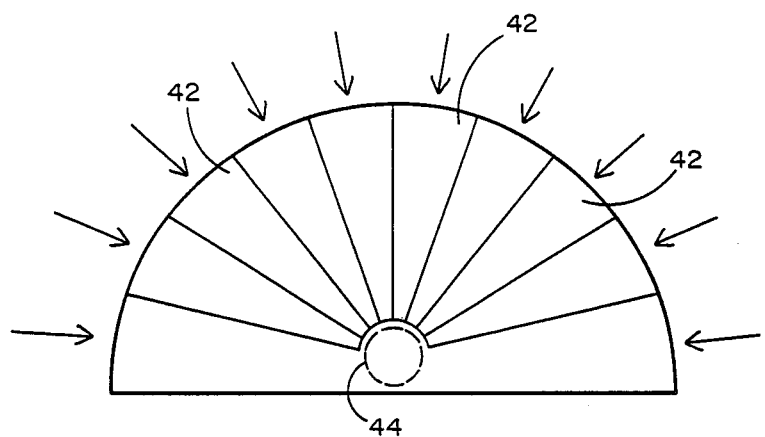
FIG. 2 is a plan view of the solar-energy absorbing pond.

The cover 24 of solar collector 20 is an airtight covering made of thin plastic sheets 42, as shown in FIG. 2. Ambient air enters the clearance between the covering and the water surface at the outer periphery of the collector (note arrows in FIG. 2); as the air travels toward the outlet 44 it is heated and humidified by solar energy. The bell mouth outlet 44 of the collector connects to the chimney 30, which creates the draft and induces the flow of air through the collector. Suitable supporting members (not shown) are located at various points to hold the cover 24 above the pond 22.

The water supply also enters at the outer periphery of the solar collector. It may be stored in a ditch 46 extending around the periphery of pond 22. As evaporation proceeds, makeup water flows toward the collector exhaust, just as does the air. A thermal gradient is thus established in the collector, with ambient temperature at the periphery, and maximum temperature in the vicinity of the chimney entrance. It is anticipated that salt water from the ocean will be the usual source of water for the collector. Since evaporation increases the mineral content of the water in the pond, the water will saturate and thereafter precipitate salts in the collector. These salts contain valuable minerals, which can be periodically harvested for additional commercial benefit.

The plastic covering 24 of the collector may be transparent to short wave radiation, so that solar energy will be readily transmitted to the pond. Alternatively the covering 24 may be opaque, in which case the solar radiation will be absorbed by the covering, and then conducted through it. Additional study is needed to determine which type of covering is more cost effective. The covering 24 should be opaque to long wave radiation, in order to minimize cooling of the pond at night.

Figure 3:
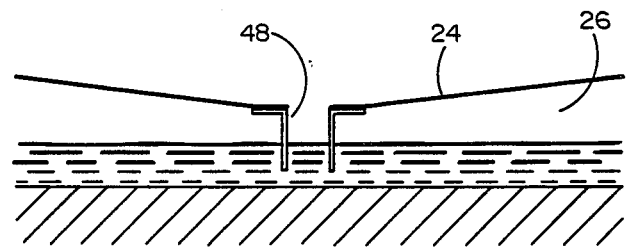
FIG. 3 shows a rain drainage method suggested to protect the pond cover.

To protect the covering from damage during rainstorms, means should be provided to allow the rain to drain into the pond. As shown in FIG. 3, flanged tubes 48 may be attached (preferably at frequent intervals) to the cover 24, in order to connect the top of the cover to the bottom of the pond, and thus permit drainage without introducing an air leak. The slope of the cover 24 toward the tube 48 in FIG. 3 is a temporary result of the weight of rain water on the cover.

Figure 4:
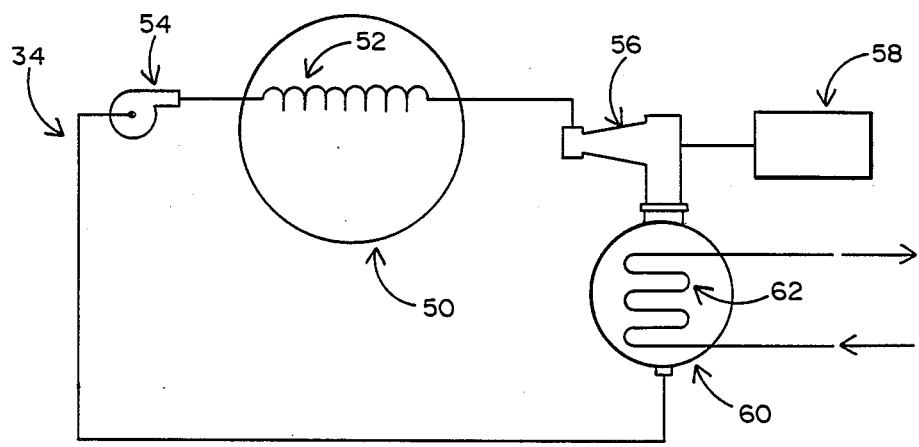
FIG. 4 shows in more detail the Rankine cycle engine and its power conversion mechanism.

FIG. 4 shows the Rankine cycle engine 34 used to convert the solar energy into power. Ammonia is a preferred material to be used in the closed loop cycle of the engine. The engine comprises a heat source, in the form of a converter 50, into which the warm humid air from the top of chimney 30 is moved by the chimney-induced velocity. This air/vapor will have a temperature of about 140° F. A heat exchanger 52, having coils inside which ammonia is flowing will convert the condensation energy of the water vapor into energy which causes the ammonia to boil, thereby transferring the energy to the confined ammonia. Additional energy is stored in the ammonia by a pump 54, which raises its pressure.

A prime mover, such as a turbine 56, is driven by the gaseous ammonia; and it in turn may be used to drive an electric generator 58. A condenser, or heat sink, 60 liquifies the low-pressure ammonia vapor, which is returned to the heat source 50 by pump 54. In order to operate engine 34 at a high efficiency, it is desirable to provide the maximum available temperature differential between heat source 50 and heat sink 60. This may be accomplished by running cold water from reservoir 36 through coils 62 inside the heat sink 60. The cold water entering from the reservoir 36 will have a temperature of about 60° F. (if drawn from the bottom of the reservoir, as shown), thus providing a differential of about 80° F. (140°−60°).

Work is produced as ammonia steam expands from 286.4 psia (saturation pressure at 120° F.) to 138.1 psia (saturation pressure at 74° F.), reactive on the turbine blades. Part of the work is put into the cycle by pump 54, as liquid ammonia is pumped from 138.1 to 286.4 psia. This work is much less that that taken out in the turbine, because of the relative incompressibility of liquid.

In a thermodynamic cycle, energy in must equal energy out, i.e., heat added−heat out=work of turbine−−work of pump.

This invention is obviously of greatest interest in desert climates where cloud cover is infrequent. Ideally it would be sited at an altitude of 6,000 ft. and near to a salt water supply for minimum pumping expense. In such areas the side benefits add up to value comparable to the value of an energy produced: (1) The fresh water produced is adequate to convert unproductive desert land into agricultural land at a ratio of 2 to 3 acres for each acre of collector surface; (2) The shores of the fresh water reservoir created and maintained at a healthful altitude is ideal for homesites; (3) The salt residue left over after evaporation contains valuable minerals easily reclaimed by periodic shutdown of the collector.

Calculations performed for a collector located in a sunny location at 30° latitude show the following performance for each square foot of collector:
  Air entering collector: 80° F., 50% relative humidity
  Air exhausting collector: 140° F., 100% relative humidity
  Net heating: 1170 Btu per day
  Air circulated: 6.72 lbs. of dry air per day
  Water evaporated: 0.955 lbs. per day
  Hot water (120° F.) produced: 0.483 lb. per day
  Useful energy in hot water: 9.66 Btu per day
  Total water condensed: 0.880 lb. per day
  Heat added to Rankine Cycle: 579 Btu per day
  Rankine Cycle efficiency, boiling at 120° F. and condensing at 74° F.: 7.7%
  Rankine power available: 0.013 Kw hrs. per day For a solar collector one square mile in area, the total power produced per day (theoretical) is 362,400 Kw hrs. and the fresh water produced is 9.026 acre feet per day.

From the foregoing description, it will be apparent that the apparatus and method disclosed in this application will provide the significant functional benefits summarized in the introductory portion of the specification.

The following claims are intended not only to cover the specific embodiments disclosed, but also to cover the inventive concepts explained herein with the maximum breadth and comprehensiveness permitted by the prior art.

What is claimed is:
1. A solar energy system comprising:
   a water pond which is heated by solar energy;
   a cover above the pond which transmits solar energy;
   an air space between the pond and the cover through which warm air and vaporized water move;
   a chimney which induces the rapid flow of warm humid air into its lower end and delivers such air at its upper end;
   a fresh water heat sink which receives condensed vapor from the chimney-induced flow;
   a heat energy driven engine, the power output of which is a function of the temperature difference between higher and lower temperature levels;
   a first heat exchanger in the engine connected to the top of the chimney, and arranged to convert the vapor condensation energy into the higher temperature level of the engine;
   a second heat exchanger in the engine arranged to provide the lower temperature of the engine by connection to the heat sink; and
   power transfer means driven by the temperature differential energy of the engine.
2. The solar energy system of claim 1 which also comprises:
   a water reservoir which receives the condensed vapor from the first heat exchanger, and which provides low temperature water to the second heat exchanger.
3. The solar energy collection system of claim 1 in which:
   the chimney is at a location remote from the periphery of the pond cover;
   air in the space between the pond and the cover enters at the periphery of the pond and flows toward the chimney as it becomes warmer; and
   water flowing in the pond enters at the periphery of the pond and flows toward the chimney as it becomes warmer.
4. A solar energy system comprising:
   a water pond which is heated by solar energy;
   a cover above the pond which transmits solar energy;
   an air space between the pond and the cover through which warm air and vaporized water move;
   a chimney which induces the rapid flow of warm humid air into its lower end and delivers such air at its upper end;
   water being supplied at the periphery of the covered pond to replace vaporized water ascending the chimney;
   air being supplied at the periphery of the covered pond to replace warm air ascending the chimney;
   the periphery of the covered pond being as remote as feasible from the chimney; and
   both the water and the air having a gradually increasing temperature as they flow from the periphery of the covered pond toward the chimney.
5. The method of utilizing solar energy which comprises:
   evaporating water from a shallow pond;
   confining a layer of air above the pond;
   causing the sun to heat the water and air, the rays passing through a cover which prevents escape of warmed air and water vapor;
   causing the warmed air and water vapor to rise in a chimney;
   replenishing the air and water at a peripheral location remote from the chimney;

the arrangement being such that a thermal gradient from lower to higher temperature exists in both the water and the air layer as they move toward the chimney.

6. The solar energy utilizing method of claim 5 in which:

the air and water vapor from the top of the chimney are fed to a heat converter in a Rankine Cycle engine;

the water vapor is condensed in the heat converter; and the heat from such condensing is transferred to a closed loop engine operating system containing an alternately evaporating and condensing fluid.

* * * * *